US012773775B2

(12) United States Patent
Wang

(10) Patent No.: US 12,773,775 B2
(45) Date of Patent: Oct. 27, 2026

(54) METHOD AND APPARATUS FOR CONTROLLING LIMBS OF A ROBOT BASED ON ATTITUDE RECOGNITION AND FOOT-DOWN POINTS TRACKING AND STORAGE MEDIUM

(71) Applicant: Beijing Xiaomi Robot Technology Co., Ltd., Beijing (CN)

(72) Inventor: Jiajun Wang, Beijing (CN)

(73) Assignee: BEIJING XIAOMI ROBOT TECHNOLOGY CO., LTD., Beijing (CN)

( * ) Notice: Subject to any disclaimer, the term of this patent is extended or adjusted under 35 U.S.C. 154(b) by 194 days.

(21) Appl. No.: 18/324,704

(22) Filed: May 26, 2023

(65) Prior Publication Data

US 2024/0253210 A1 Aug. 1, 2024

(30) Foreign Application Priority Data

Jan. 31, 2023 (CN) ......................... 202310125820.2

(51) Int. Cl.
*B25J 9/00* (2006.01)
*B25J 9/16* (2006.01)
*B62D 57/032* (2006.01)

(52) U.S. Cl.
CPC ........... *B25J 9/1602* (2013.01); *B25J 9/1633* (2013.01); *B62D 57/032* (2013.01)

(58) Field of Classification Search
CPC ...... B25J 9/1602; B25J 9/1633; B25J 9/1651; B25J 9/1664; B62D 57/032
See application file for complete search history.

(56) References Cited

U.S. PATENT DOCUMENTS 8,352,077 B2 * 1/2013 Goswami ............ B62D 57/032 700/263
11,556,724 B1 * 1/2023 Barter .................... G06N 3/084
(Continued)

FOREIGN PATENT DOCUMENTS

CN 108572553 A * 9/2018 .......... B62D 57/032
CN 109693236 A 4/2019
(Continued)

OTHER PUBLICATIONS

Hybrid Momentum Compensation Control by Using Arms for Bipedal Dynamic Walking. Biomimetics (Basel). Jan. 12, 2023 (Year: 2023).*
(Continued)

*Primary Examiner* — Michael C Zarroli
*Assistant Examiner* — Shaheda Hoque
(74) *Attorney, Agent, or Firm* — McCoy Russell LLP

(57) ABSTRACT

A method for controlling a robot includes: obtaining reference data and actual data of the robot at a current control moment, the reference data including reference physical values corresponding to target parts when the robot performs a target motion, and the actual data including actual physical values corresponding to the target parts when the robot performs the target motion; determining an actual attitude of the robot according to the actual data, the actual attitude including one of a support phase or a flight phase; determining a target control parameter of the robot based on the reference data and the actual data according to the actual attitude; and controlling the robot according to the target control parameter.

12 Claims, 9 Drawing Sheets

(56) References Cited

U.S. PATENT DOCUMENTS

| | | | | |
|---|---|---|---|---|
| 11,833,680 | B2 * | 12/2023 | Deits | G05D 1/249 |
| 2005/0209534 | A1 * | 9/2005 | Dariush | G09B 23/32 600/595 |
| 2005/0209535 | A1 * | 9/2005 | Dariush | A61B 5/4528 600/595 |
| 2005/0209536 | A1 * | 9/2005 | Dariush | A61B 5/1038 600/595 |
| 2009/0312867 | A1 * | 12/2009 | Hasegawa | B62D 57/032 700/245 |
| 2010/0017028 | A1 | 1/2010 | Suga et al. | |
| 2011/0022232 | A1 * | 1/2011 | Yoshiike | B62D 57/032 700/260 |
| 2011/0040407 | A1 * | 2/2011 | Lim | B25J 9/162 700/258 |
| 2013/0144441 | A1 * | 6/2013 | Kanazawa | B25J 9/1607 700/263 |
| 2013/0238122 | A1 * | 9/2013 | Hodgins | B62D 57/032 901/1 |
| 2019/0070729 | A1 * | 3/2019 | Kamioka | B62D 57/032 |
| 2021/0221455 | A1 * | 7/2021 | Wang | B62D 57/032 |
| 2022/0019196 | A1 * | 1/2022 | Wang | B25J 9/1607 |
| 2022/0324109 | A1 * | 10/2022 | Zeng | B25J 9/163 |
| 2023/0016514 | A1 * | 1/2023 | Zheng | G05D 1/0251 |
| 2023/0234655 | A1 * | 7/2023 | Ge | G05D 1/0212 700/245 |
| 2024/0059364 | A1 * | 2/2024 | Lindgren | B62D 65/024 |
| 2024/0317510 | A1 * | 9/2024 | Lindgren | B65G 47/90 |

FOREIGN PATENT DOCUMENTS

| | | | | | |
|---|---|---|---|---|---|
| CN | 109693237 | A | * | 4/2019 | B25J 9/16 |
| CN | 110405762 | A | * | 11/2019 | |
| CN | 111176283 | A | * | 5/2020 | G05D 1/0221 |
| CN | 112207825 | A | | 1/2021 | |
| CN | 112987769 | A | | 6/2021 | |
| CN | 113071577 | A | * | 7/2021 | B62D 57/032 |
| CN | 113753146 | A | * | 12/2021 | B62D 57/02 |
| CN | 114115280 | A | | 3/2022 | |
| CN | 114625129 | A | | 6/2022 | |
| CN | 110712201 | B | * | 9/2022 | |
| CN | 115202378 | A | * | 10/2022 | |
| CN | 115476352 | A | * | 12/2022 | B25J 11/00 |
| CN | 115480561 | A | * | 12/2022 | G05D 1/0251 |
| CN | 115480581 | A | * | 12/2022 | G05D 1/0891 |
| CN | 115933723 | A | * | 4/2023 | |
| CN | 114625129 | B | * | 9/2023 | |
| CN | 118081729 | A | * | 5/2024 | B25J 9/1602 |
| CN | 118131800 | A | * | 6/2024 | B62D 57/032 |
| EP | 2384863 | A2 | * | 11/2011 | B25J 9/1633 |
| EP | 3186041 | B1 | * | 4/2019 | B62D 57/032 |
| EP | 4273031 | A1 | * | 11/2023 | B62D 57/02 |
| JP | 3555945 | B2 | * | 8/2004 | |
| JP | 4770990 | B2 | * | 9/2011 | |
| JP | 2012040644 | A | * | 3/2012 | |
| JP | 2013521135 | A | * | 6/2013 | B62D 57/032 |
| JP | 2015208790 | A | * | 11/2015 | |
| JP | 6149791 | B2 | * | 6/2017 | |
| JP | 2024025624 | A | * | 2/2024 | B62D 57/032 |
| KR | 20180003627 | A | * | 1/2018 | B25J 5/00 |

OTHER PUBLICATIONS

Otani T, Hashimoto K, Miyamae S, Ueta H, Natsuhara A, Sakaguchi M, Kawakami Y, Lim H-O, Takanishi A. Upper-Body Control and Mechanism of Humanoids to Compensate for Angular Momentum in the Yaw Direction Based on Human Running. Applied Sciences. 2018; 8(1):44. https://doi.org/10.3390/app8010044 (Year: 2018).*

Gao Z, Chen X, Yu Z, Han L, Zhang J, Huang G. Hybrid Momentum Compensation Control by Using Arms for Bipedal Dynamic Walking. Biomimetics (Basel). Jan. 12, 2023;8(1):31. doi:10.3390/biomimetics8010031. PMID: 36648817; PMCID: PMC9844417. (Year: 2023).*

Colasanto, L. et al., "Internal Model Control for Improving the Gait tracking of a Compliant Humanoid Robot," Proceedings of the 2012 IEEE/RSJ International Conference on Intelligent Robots and Systems, Oct. 7, 2012, Vilamoura-Algarve, Portugal, 6 pages.

* cited by examiner

METHOD AND APPARATUS FOR CONTROLLING LIMBS OF A ROBOT BASED ON ATTITUDE RECOGNITION AND FOOT-DOWN POINTS TRACKING AND STORAGE MEDIUM

CROSS REFERENCE TO RELATED APPLICATION

The present application claims the benefit of priority to Chinese Application No. 202310125820.2, filed on Jan. 31, 2023, the contents of which are incorporated herein by reference in their entireties for all purposes.

BACKGROUND

Motion of a leg robot, especially, walking of a humanoid robot, usually has characteristics of being high in nonlinearity and degree of freedom and being mixed with a continuous system and a discrete system.

SUMMARY

The disclosure relates to the technical field of robots, in particular to a method and apparatus for controlling a robot, and a storage medium.

According to a first aspect of an example of the disclosure, a method for controlling a robot is provided and includes:

- obtaining reference data and actual data of the robot at a current control moment, the reference data being reference physical values corresponding to a plurality of target parts when the robot performs a target motion, and the actual data being actual physical values corresponding to the plurality of target parts when the robot performs the target motion;
- determining an actual attitude of the robot according to the actual data, the actual attitude being one of a support phase or a flight phase;
- determining a first target control parameter of the robot based on the reference data and the actual data according to the actual attitude; and
- controlling the robot according to the first target control parameter.

According to a second aspect of an example of the disclosure, an electronic device is provided and includes:

- a processor; and
- a memory, configured to store an instruction executable by the processor; where the processor is configured to:
- obtain reference data and actual data of the robot at a current control moment, the reference data being reference physical values corresponding to a plurality of target parts when the robot performs a target motion, and the actual data being actual physical values corresponding to the plurality of target parts when the robot performs the target motion;
- determine an actual attitude of the robot according to the actual data, the actual attitude being one of a support phase or a flight phase;
- determine a first target control parameter of the robot based on the reference data and the actual data according to the actual attitude; and
- control the robot according to the first target control parameter.

According to a third aspect of an example of the disclosure, a non-transitory computer-readable storage medium is provided, storing a computer program instruction, a processor runs the program instruction to perform:

- obtaining reference data and actual data of the robot at a current control moment, the reference data being reference physical values corresponding to a plurality of target parts when the robot performs a target motion, and the actual data being actual physical values corresponding to the plurality of target parts when the robot performs the target motion;
- determining an actual attitude of the robot according to the actual data, the actual attitude being one of a support phase or a flight phase;
- determining a first target control parameter of the robot based on the reference data and the actual data according to the actual attitude; and
- controlling the robot according to the first target control parameter.

It is to be understood that the above general description and the following detailed description are merely examples and explanatory instead of limiting the disclosure.

BRIEF DESCRIPTION OF THE DRAWINGS

Accompanying drawings here, which are incorporated in and constitute a part of the specification, illustrate examples consistent with the disclosure and, together with the specification, serve to explain principles of the disclosure.

DETAILED DESCRIPTION

Examples will be described in detail here, and their instances are shown in the accompanying drawings. Unless otherwise represented, when the following description refers to the accompanying drawings, the same number in the different accompanying drawings represents the same or similar elements. Implementations described in the following examples do not represent all implementations consistent with the disclosure. On the contrary, they are merely examples of apparatuses and methods consistent with some aspects of the disclosure as detailed in the appended claims.

In the related art, control over jumping of the robot is not high enough in control accuracy, which causes failure in effective control over the robot.

In order to overcome the problem in the related art, the disclosure provides a method and apparatus for controlling a robot, and a storage medium. By obtaining reference data and actual data of the robot corresponding to a current moment and determining a current actual attitude of the robot, a corresponding control parameter is determined according to the actual attitude. Determining corresponding control parameters according to different actual attitudes can improve control accuracy of the robot.

Figure 1:
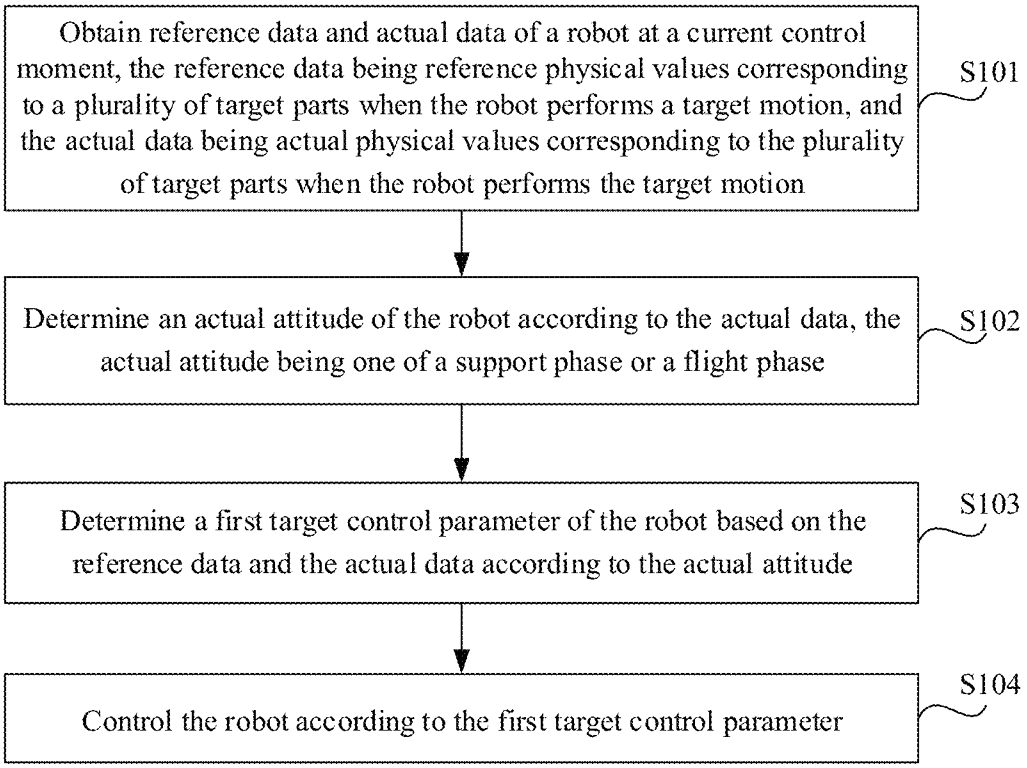
FIG. 1 is a flowchart of a method for controlling a robot shown according to an example.

FIG. 1 is a flowchart of a method for controlling a robot shown according to an example. As shown in FIG. 1, the method includes the following steps.

In step S101, reference data and actual data of the robot at a current control moment are obtained, the reference data being reference physical values corresponding to a plurality of target parts when the robot performs a target motion, and the actual data being actual physical values corresponding to the plurality of target parts when the robot performs the target motion.

In this implementation, in a process of jumping of the robot, the robot may be controlled at a target time interval, for example, the target time interval may be 100 milliseconds. A plurality of control moments may be set according to the target time interval, data of the robot are obtained at the current control moment, and control over the robot is executed. The reference data may be obtained based on a reference trajectory, and the reference trajectory is a reference trajectory that the robot jumps continuously, and may be obtained through a full model offline trajectory optimization method, simplified model planning, human body motion capturing, collection and processing or other methods. The target motion may be a continuous jumping motion, the reference physical values corresponding to the plurality of target parts may be attitudes in six directions (including x, y, z, roll, pitch and yaw) of a generalized state waist coordinate system (also called a floating base) corresponding to the reference trajectory relative to a world coordinate system, a six-dimension velocity and six-dimension accelerated velocity, and positions, velocities and accelerated velocities of whole body joints. The actual physical values corresponding to the plurality of target parts may be actually detected attitudes in six directions (including x, y, z, roll, pitch and yaw) of the generalized state waist coordinate system (also called the floating base) of the robot relative to the world coordinate system, a six-dimension velocity and six-dimension accelerated velocity, and positions, velocities and accelerated velocities of the whole body joints.

In step S102, an actual attitude of the robot is determined according to the actual data, the actual attitude being one of a support phase or a flight phase.

In this implementation, the actual attitude of the robot may be determined according to a state of jumping of the robot, and the actual attitude is one of the support phase or the flight phase. The support phase may be a state within an on-ground time period, and the flight phase may be a state within a jumping time period.

In step S103, a first target control parameter of the robot is determined based on the reference data and the actual data according to the actual attitude.

In this implementation, as for the actual attitude, different actual attitudes correspond to different control strategies, and the first target control parameter of the robot may be obtained according to the control strategies corresponding to the actual attitudes in combination with the reference data and the actual data.

In step S104, the robot is controlled according to the first target control parameter.

In this implementation, the first target control parameter may include control parameters of a plurality of parts, a motion of the plurality of parts may be controlled according to the control parameters of the plurality of parts, and thus control over whole jumping of the robot is achieved.

By continuously repeating the above steps, the robot is controlled at a plurality of control moments of continuous jumping of the robot, so that accurate control over continuous jumping of the robot may be achieved.

In this example, the reference data and the actual data of the robot at the current control moment are obtained, the reference data being reference physical values corresponding to a plurality of target parts when the robot performs a target motion, and the actual data being actual physical values corresponding to the plurality of target parts when the robot performs the target motion; the actual attitude of the robot is determined according to the actual data, the actual attitude being one of the support phase or the flight phase; then the first target control parameter of the robot is determined based on the reference data and the actual data according to the actual attitude; and finally, the robot is controlled according to the first target control parameter. In the disclosure, by obtaining the reference data and the actual data of the robot corresponding to the current moment, determining the current actual attitude of the robot, then determining the corresponding control parameters according to the actual attitude and performing determining the corresponding control parameters according to different actual attitudes, the control accuracy of the robot can be improved, and accurate control during jumping of the robot is achieved.

Figure 2:
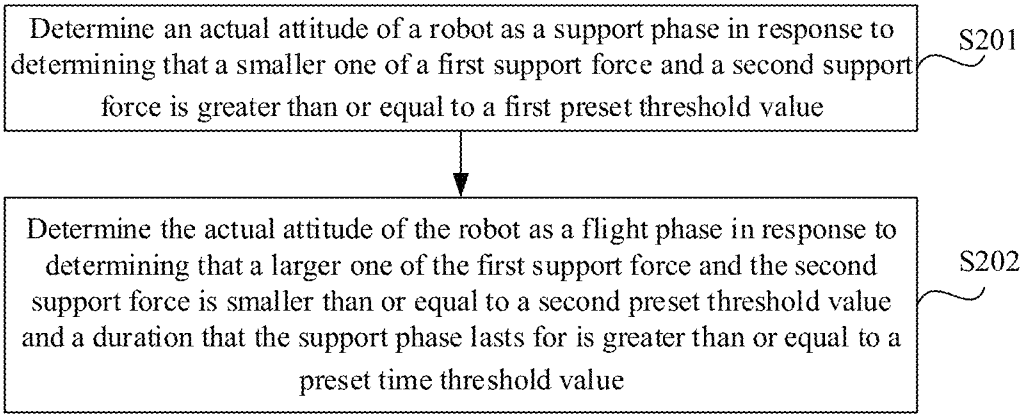
FIG. 2 is a flowchart of a method for determining an actual attitude of a robot shown according to an example.

FIG. 2 is a flowchart of a method for determining an actual attitude of a robot shown according to an example. As shown in FIG. 2, the actual data include a first support force of a first foot bottom and a second support force of a second foot bottom.

The determining an actual attitude of the robot according to the actual data may include the following steps.

In step S201, the actual attitude of the robot is determined as the support phase in response to determining that a smaller one of the first support force and the second support force is greater than or equal to a first preset threshold value.

In this implementation, the robot includes the first foot bottom and the second foot bottom, the first support force of the first foot bottom and the second support force of the second foot bottom of the robot may be obtained, and both the first support force and the second support force are support forces applied to the foot bottoms in a vertical direction. For example, when a smallest force $$f_z^{max}$$

applied to the foot bottoms of the robot in the vertical direction from the ground is greater than or equal to a first preset value $\alpha mg$, the robot enters the support phase, and otherwise, the robot continues being in the flight phase.

$$f_z^{max}$$

takes a smallest one of support forces applied to a left foot and a right foot in the vertical direction, m is a mass of the robot, and g is gravitational acceleration. $\alpha$ is a constant coefficient greater than 0 and smaller than 1, for example, 0.3, which may be adjusted according to actual conditions.

In step S202, the actual attitude of the robot is determined as the flight phase in response to determining that a larger one of the first support force and the second support force is smaller than or equal to a second preset threshold value and a duration that the support phase lasts for is greater than or equal to a preset time threshold value.

In this implementation, when the robot is in the support phase, a greatest force $$f_z^{max}$$

applied to the foot bottoms of the robot in the vertical direction from the ground is smaller than or equal to the second preset threshold value βmg, and the duration $t_s$ in the support phase this time is greater than a preset time threshold value $T_s$, the robot enters the flight phase, and otherwise, the robot continues being in the support phase.

$$f_z^{max}$$

takes the greatest force applied to the left foot and the right foot in the vertical direction from the ground, m is the mass of the robot, and g is the gravitational acceleration. β is a constant coefficient greater than 0 and smaller than 1, for example, 0.2, which may be adjusted according to actual conditions. The preset time threshold value $T_s$ may be determined according to the reference trajectory.

The first support force of the first foot bottom and the second support force of the second foot bottom may be determined according to the following method: force sensors are mounted at the foot bottoms to directly measure a magnitude of a foot bottom force in the vertical direction. Alternatively, torque sensors are mounted on leg joints to measure torque of each leg joint first, and then the magnitude of the foot bottom force in the vertical direction is obtained through a static Jacobian mapping relationship.

Through the above method, whether the robot is in the flight phase or the support phase may be determined according to the first support force of the first foot bottom and the second support force of the second foot bottom. Thus, different control parameters are determined according to different actual attitudes, so as to achieve a purpose of accurate control.

In a possible implementation, the first target control parameter includes a first lower limb control parameter.

A method for determining the first target control parameter of the robot based on the reference data and the actual data according to the actual attitude may be: determining the first lower limb control parameter of the robot according to the reference data and the actual data with tracking a barycenter line momentum and an upper body attitude as a target in a case that the actual attitude is the support phase.

In this implementation, in a case that the actual attitude is the support phase, a control strategy corresponding to the support phase may be determined, that is, the first lower limb control parameter of the robot is determined based on the reference data and the actual data with tracking the barycenter line momentum and the upper body attitude as the target, so that a plurality of joints of lower limbs of the robot are controlled according to the obtained first lower limb control parameter.

Figure 3:
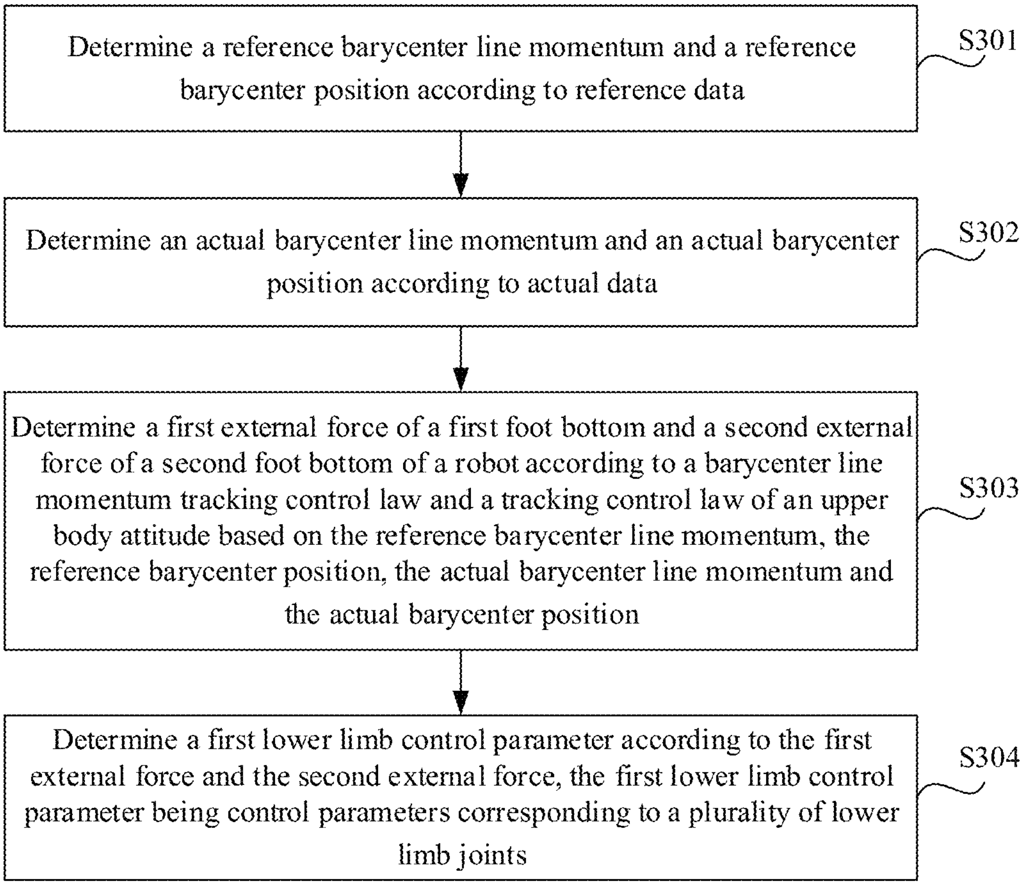
FIG. 3 is a flowchart of a method for determining a first lower limb control parameter shown according to an example.
Figure 4:
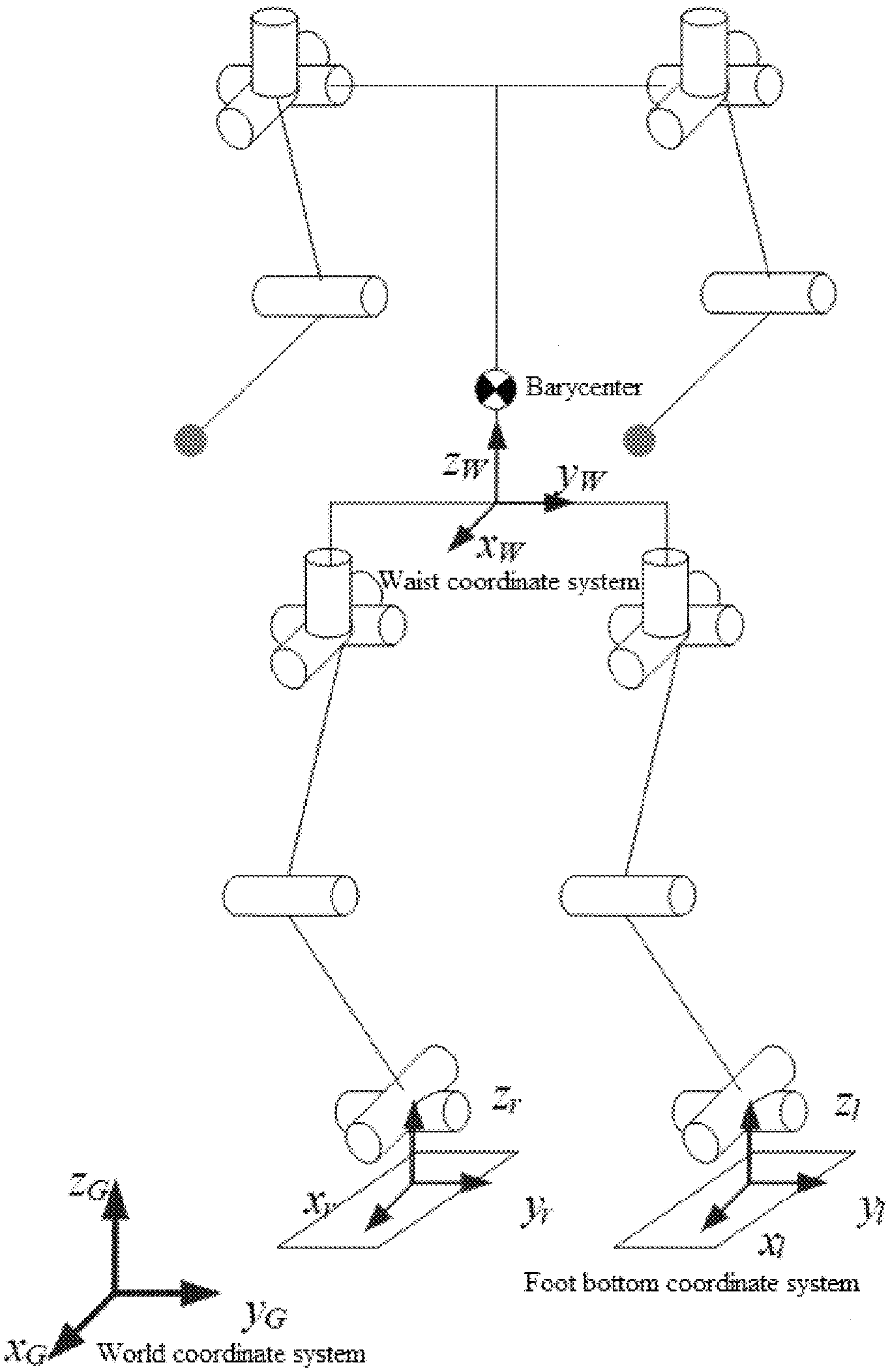
FIG. 4 is a schematic diagram of a robot coordinate system and joint distribution shown according to an example.
Figure 5:
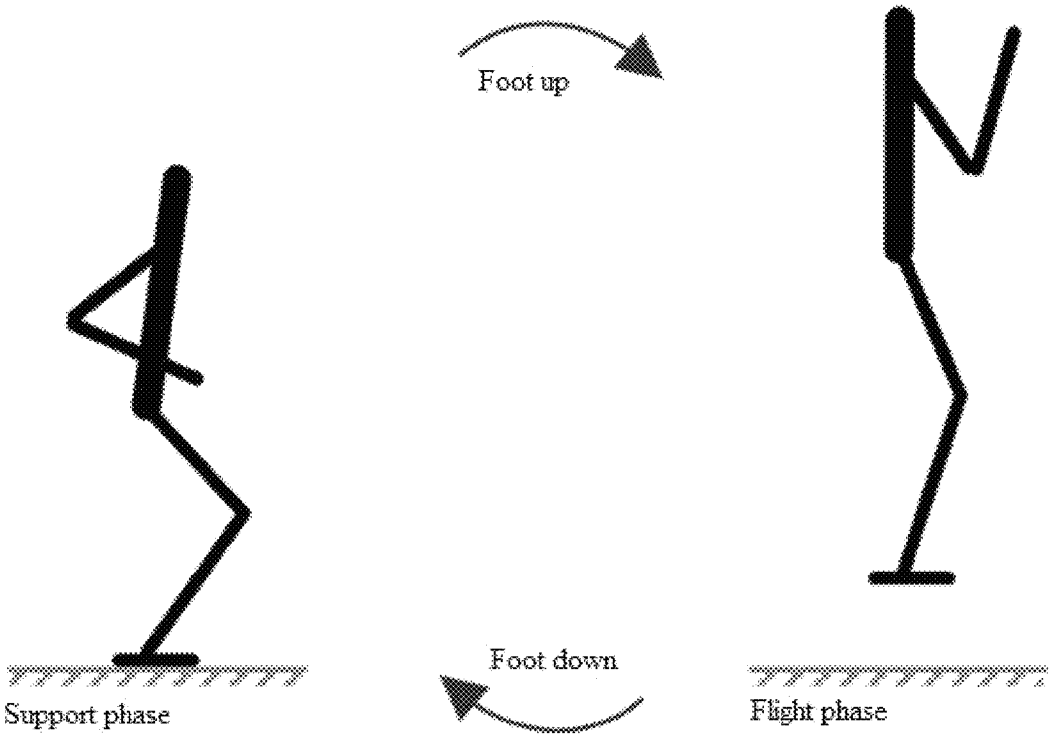
FIG. 5 is a schematic diagram of a robot jumping process shown according to an example.

FIG. 3 is a flowchart of a method for determining a first lower limb control parameter shown according to an example. FIG. 4 is a schematic diagram of a robot coordinate system and joint distribution shown according to an example. FIG. 5 is a schematic diagram of a robot jumping process shown according to an example. As shown in FIG. 3 to FIG. 5, in a possible implementation, the determining the first lower limb control parameter of the robot according to the reference data and the actual data with tracking a barycenter line momentum and an upper body attitude as a target may include the following steps.

In step S301, a reference barycenter line momentum and a reference barycenter position are determined according to the reference data.

In this implementation, the provided method is described by taking a humanoid robot shown in FIG. 4 as an example. In the humanoid robot shown in FIG. 4, each leg has six joints which include three joints of a hip part in directions of yaw, roll and pitch, one joint of a knee part in a direction of pitch and two joints of an ankle part in directions of pitch and roll. Each arm of the robot has at least four degrees of freedom which include three joints of a shoulder part in directions of pitch, roll and yaw, one joint of an elbow part in a direction of pitch and two to three joints of a wrist part. As a mass inertia of each hand is quite small relative to a whole body, and an influence on robot dynamics may be ignored, so wrist joints may be ignored. Roll, pitch and yaw are rotations in local x, y and z coordinate directions respectively.

When the humanoid robot jumps, there are the support phase and the flight phase according to whether the double feet are in contact with the ground, a continuous jumping action is completed by cyclic alternating of two phases of foot up and foot down, as shown in FIG. 5.

The reference trajectory at least includes a reference curve $X^{ref}(t)$ that a generalized state changes over time, where the generalized state X includes attitudes in six directions (including x, y, z, roll, pitch and yaw) of a waist coordinate system (also called a floating base) relative to the world coordinate system, a six-dimension velocity and a six-dimension accelerated velocity, and positions, velocities and accelerated velocities of whole body joints, as shown in the following formula:

$$\begin{cases} X = [q^T, \dot{q}^T, \ddot{q}^T]^T \\ q = [q_{float}^T, q_{leg}^T, q_{arm}^T]^T \\ \dot{q} = [\dot{q}_{float}^T, \dot{q}_{leg}^T, \dot{q}_{arm}^T]^T \\ \ddot{q} = [\ddot{q}_{float}^T, \ddot{q}_{leg}^T, \ddot{q}_{arm}^T]^T \end{cases} \quad (1)$$

$q_{float}=[q_x, q_y, q_z, q_{roll}, q_{pitch}, q_{yaw}]^T \in R^{6\times1}$ is a position of the floating base in the world coordinate system, $q_{leg}R^{12\times1}$ represents twelve joints of a lower left limb and a lower right limb, and $q_{arm} \in R^{8\times1}$ represents eight joints of an upper left limb and an upper right limb. A velocity $\dot{q}$ and an accelerated velocity $\ddot{q}$ of a generalization q are consistent with a dimension of q.

At each control moment, according to current time t, a barycenter momentum and its derivative of the robot may be solved according to a current generalized joint velocity in the reference data, and a calculation mode is as follows:

$$\begin{cases} h^{ref} = \begin{bmatrix} l^{ref} \\ k^{ref} \end{bmatrix} = A_G^{ref}(q^{ref})\dot{q}^{ref} \\ \dot{h}^{ref} = \begin{bmatrix} \dot{l}^{ref} \\ \dot{k}^{ref} \end{bmatrix} = A_G^{ref}(q^{ref})\ddot{q}^{ref} + \dot{A}_G^{ref}(q^{ref}, \dot{q}^{ref})\dot{q}^{ref} \end{cases} \quad (2)$$

For concise expression, t in the following formula is omitted in the disclosure. In the above formula, a superscript ref represents being obtained from the reference trajectory $X^{ref}(t)$, h is a momentum of the robot, l is a linear momentum, and k is an angular momentum. Ac is a barycenter momentum matrix of the robot, is a function related to a generalized coordinate position q and may be obtained through coordinate transformation according to an inertia matrix of the robot, and $(q^{ref})$ is an independent variable of $A_G$. $\dot{A}_G\dot{q}$ is a product of a barycenter momentum matrix derivative and a generalized velocity of the robot and may be obtained through coordinate transformation according to a Coriolis force vector and a centrifugal force vector of the robot, and $(q^{ref},\dot{q}^{ref})$ is an independent variable of $\dot{A}_G\dot{q}$. Through the above formula, a reference barycenter momentum and its derivative of the robot may be obtained based on the reference data, where the reference barycenter momentum includes a reference barycenter line momentum and a reference barycenter angular momentum.

Besides, through forward kinematics, according to a generalized position $q^{ref}$, a reference trajectory $$[x_{com}^{ref}, y_{com}^{ref}, z_{com}^{ref}]^T,$$

namely, a reference barycenter position of the robot, of a robot barycenter position in the world coordinate system may be calculated.

Through the above method, the reference barycenter line momentum and the reference barycenter position may be determined according to the reference data.

In step S302, an actual barycenter line momentum and an actual barycenter position are determined according to the actual data.

In this implementation, in order to realize closed-loop control, within each control period, apart from obtaining the reference barycenter momentum and the reference barycenter momentum derivative in this control frame (namely, the current control moment) according to the formula (2), an actual barycenter momentum and an actual barycenter position may also be calculated, where the actual barycenter momentum includes the actual barycenter line momentum and the actual barycenter angular momentum. An actual generalized state $X^{act}(t)$ of the robot at the current control moment may be obtained by means of an appropriate state estimation algorithm through an inertial measurement unit (IMU) mounted on an upper body and an encoder at each joint, and in a case of no ambiguity, a superscript act is omitted and simplified as X(t) in the disclosure. A mode of obtaining the actual barycenter momentum and its derivative of the robot at the current control moment through the following formula may be:

$$\begin{cases} h = \begin{bmatrix} l \\ k \end{bmatrix} = A_G\dot{q} \\ \dot{h} = \begin{bmatrix} \dot{l} \\ \dot{k} \end{bmatrix} = A_G\ddot{q} + \dot{A}_G\dot{q} \end{cases} \tag{3}$$

Meanings of symbols are the same as those in the formula (2) and are not repeated here, and independent variables of $A_G$ and $\dot{A}_G\dot{q}$ are omitted here. Besides, through forward kinematics, the actual barycenter position $[x_{com},y_{com},z_{com}]^T$ of the robot in the world coordinate system may be calculated according to the generalized position q.

In step S303, a first external force of a first foot bottom and a second external force of a second foot bottom of the robot are determined according to a barycenter line momentum tracking control law and a tracking control law of the upper body attitude based on the reference barycenter line momentum, the reference barycenter position, the actual barycenter line momentum and the actual barycenter position.

In this implementation, in the support phase of the robot, a control target of a controller is to track the barycenter line momentum $l^{ref}$ and the upper body attitude (namely, three attitude angles of roll, pitch and yaw in the floating base $q_{float}$) of the robot. First, expected external forces at the left foot and the right foot are calculated, as the barycenter line momentum and the upper body attitude may be changed through an external force, external forces expected to act on right and left foot bottom coordinate systems are set to be $$F_L = [f_L^x, f_L^y, f_L^z, \tau_L^x, \tau_L^y, \tau_L^z]^T \text{ and } F_R = [f_R^x, f_R^y, f_R^z, \tau_R^x, \tau_R^y, \tau_R^z]^T$$

respectively, where $F_L$ is the first external force of the first foot bottom, $F_R$ is the second external force of the second foot bottom, and the right and left foot bottom coordinate systems may refer to FIG. 1.

Thus, the barycenter line momentum tracking control law is:

$$\begin{bmatrix} f_R^x \\ f_R^y \\ f_R^z \end{bmatrix} + \begin{bmatrix} f_L^x \\ f_L^y \\ f_L^z \end{bmatrix} - m\begin{bmatrix} 0 \\ 0 \\ g \end{bmatrix} = \dot{l}^{ref} + K_1(l^{ref} - l) + K_2\begin{bmatrix} x_{com}^{ref} - x_{com} \\ y_{com}^{ref} - y_{com} \\ y_{com}^{ref} - z_{com} \end{bmatrix} \tag{4}$$

The tracking control law of the upper body attitude is:

$$r_{com}^R \times \begin{bmatrix} f_R^x \\ f_R^y \\ f_R^z \end{bmatrix} + \begin{bmatrix} \tau_R^x \\ \tau_R^y \\ \tau_R^z \end{bmatrix} + r_{com}^L \times \begin{bmatrix} f_L^x \\ f_L^y \\ f_L^z \end{bmatrix} + \begin{bmatrix} \tau_L^x \\ \tau_L^y \\ \tau_L^z \end{bmatrix} = K_3\begin{bmatrix} q_{roll}^{ref} - q_{roll} \\ q_{pitch}^{ref} - q_{pitch} \\ q_{yaw}^{ref} - q_{yaw} \end{bmatrix} + K_4\begin{bmatrix} \dot{q}_{roll}^{ref} - \dot{q}_{roll} \\ \dot{q}_{pitch}^{ref} - \dot{q}_{pitch} \\ \dot{q}_{yaw}^{ref} - \dot{q}_{yaw} \end{bmatrix} \tag{5}$$

$$r_{com}^L \text{ and } r_{com}^R$$

represent vectors of pointing from the barycenter position to origins of a left foot coordinate system and a right foot coordinate system respectively. × represents multiplication cross between three-dimension vectors. $K_1$, $K_2$, $K_3$, $K_4$ is a gain coefficient matrix and is usually used as an adjustable parameter.

In simultaneous equations (4) and (5), their unknown quantities are $$F_R = [f_R^x, f_R^y, f_R^z, \tau_R^x, \tau_R^y, \tau_R^z]^T \text{ and } F_L = [f_L^x, f_L^y, f_L^z, \tau_L^x, \tau_L^y, \tau_L^z]^T,$$

there are 12 dimensions, and the number of equations is 6. An equation set (4)(5) may be arranged to be $C_{6\times12}x_{12\times}$ $_1$=$d_{6\times1}$, and a least square solution of the equation set is $(C^TC)^{-1}C^Td$ and is expected external forces $[F_R,F_L]$ applied to the double feet from the ground, that is, the first external force of the first foot bottom and the second external force of the second foot bottom.

In step S304, the first lower limb control parameter is determined according to the first external force and the second external force, the first lower limb control parameter being control parameters corresponding to a plurality of lower limb joints.

In this implementation, velocity Jacobian matrixes of the robot from a waist coordinate system to the origins of the right and left foot bottom coordinate systems are set to be $J_{leg,L}$ and $J_{leg,R}$ respectively, and through static Jacobian mapping, the expected foot bottom external forces are mapped to expected joint torque of a joint space:

$$\begin{cases} \tau_{leg,L}^{support} = -J_{leg,L}^{T}F_L \\ \tau_{leg,R}^{support} = -J_{leg,R}^{T}F_R \end{cases} \quad (6)$$

where $$\left[\tau_{leg,L}^{support},\ \tau_{leg,R}^{support}\right]$$

is the first lower limb control parameter.

After the first lower limb control parameter is obtained, $$\left[\tau_{leg,L}^{support},\ \tau_{leg,R}^{support}\right]$$

may be used as a joint instruction to be sent to a plurality of lower limb joint ends, and the joints execute the torque instruction so as to complete control over lower limbs during the support phase.

In a possible implementation, the first target control parameter includes a second lower limb control parameter.

The determining a first target control parameter of the robot based on the reference data and the actual data according to the actual attitude includes:

the second lower limb control parameter of the robot is determined according to the reference data and the actual data with tracking foot-down points of feet ends as a target in a case that the actual attitude is the flight phase.

In a possible implementation, a method for determining the second lower limb control parameter of the robot according to the reference data and the actual data with tracking the foot-down points of the feet ends as the target may be:

a barycenter velocity error of the robot in a target direction is determined according to the reference data and the actual data, the barycenter velocity error being used for adjusting positions of the foot-down points relative to a barycenter; and the second lower limb control parameter is determined according to reference positions and reference velocities of a plurality of lower limb joints in the reference data and the barycenter velocity error, the second lower limb control parameter being control parameters corresponding to the plurality of lower limb joints.

In this implementation, as in the process of jumping of the robot, a forward and backward barycenter velocity is prone to departing from an expected reference barycenter velocity, an expected barycenter velocity is stabilized or tracked by adjusting the foot-down points in the flight phase. A strategy here is:

except two joints of hip parts of right and left legs in pitch, expected positions of 10 other joints of the legs are reference joint positions in the reference trajectory.

Figure 6:
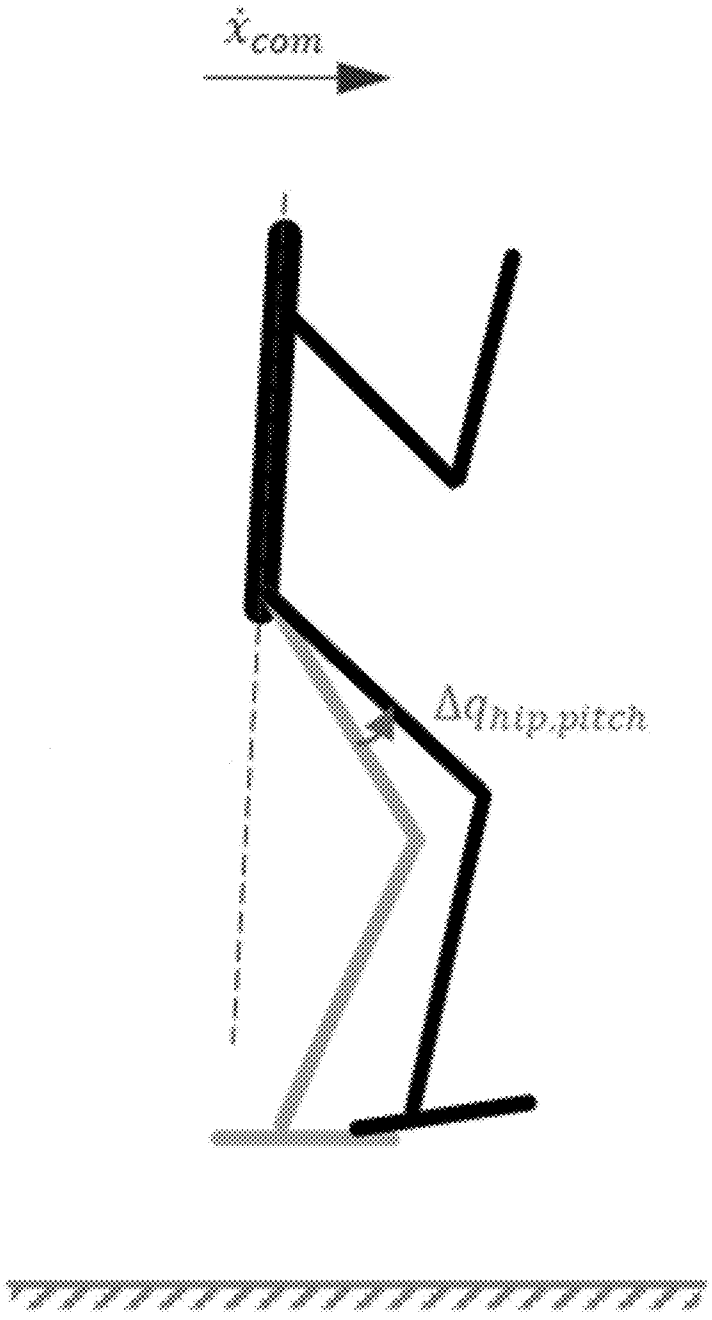
FIG. 6 is a schematic diagram of robot jumping and swinging legs shown according to an example.

FIG. 6 is a schematic diagram of robot jumping and swinging legs shown according to an example. As shown in FIG. 6, angles of joints of the hip parts in pitch are adjusted according to a forward and backward barycenter velocity error, a joint direction is set as shown in FIG. 6, so an adjustment amount is $$\Delta q_{hip,pitch} = -\rho\left(\dot{x}_{com}^{ref} - \dot{x}_{com}\right),$$

where ρ is a constant coefficient and is an adjustable parameter according to actual performance of the robot, and positions of the foot-down points relative to a barycenter are adjusted by adjusting an angle of pitch of the hip parts.

Expected velocities of all twelve joints of the legs are joint velocities in the reference trajectory.

To sum up, $$\begin{cases} q_{leg}^{des} = \begin{cases} q_{i1}^{ref} + \Delta q_{hip,pitch} \\ q_{i2}^{des} \end{cases} \\ \dot{q}_{leg}^{des} = \dot{q}_{leg}^{ref} \end{cases} \quad (7)$$

where i1 is a hip-pitch joint, i2 is other lower limb joints except the hip-pitch joint.

An expected joint torque (namely, the second lower limb control parameter) of a lower limb joint space is:

$$\tau_{leg}^{flight} = K_5\left(q_{leg}^{des} - q_{leg}\right) + K_6\left(\dot{q}_{leg}^{des} - \dot{q}_{leg}\right) \quad (8)$$

where $K_5$, $K_6$ is the gain coefficient matrix and is usually used as an adjustable parameter.

After the second lower limb control parameter is obtained through the above formula, $$\tau_{leg}^{flight}$$

may be used as a joint instruction to be sent to a plurality of lower limb joint ends, and the joints execute the torque instruction so as to complete control over lower limbs during the support phase.

Besides, in a feasible implementation, after the robot reaches a highest point in air, in a falling process, a parameter magnitude of $K_5$, $K_6$ is smoothly reduced, the parameter magnitude of $K_5$, $K_6$ at an expected falling-to-ground moment is reduced to y of the original, 0<γ<1 is an adjustable parameter, and it aims to prevent a rigidity of the joints from being too large when falling to the ground and to achieve a certain falling-to-ground buffer effect.

In a possible implementation, upper limb joints of the robot may also be controlled, and the second target control parameter of the robot may be determined with tracking a barycenter angular momentum and positions and velocities of a plurality of upper limb joints as a target according to the reference data and the actual data.

The controlling the robot according to the first target control parameter may include:

the robot is controlled according to the first target control parameter and the second target control parameter, the first target control parameter being control parameters corresponding to the plurality of lower limb joints, and the second target control parameter being control parameters corresponding to the plurality of upper limb joints.

In this implementation, a more accurate control effect can be obtained by controlling the plurality of lower limb joints and the plurality of upper limb joints.

Figure 7:
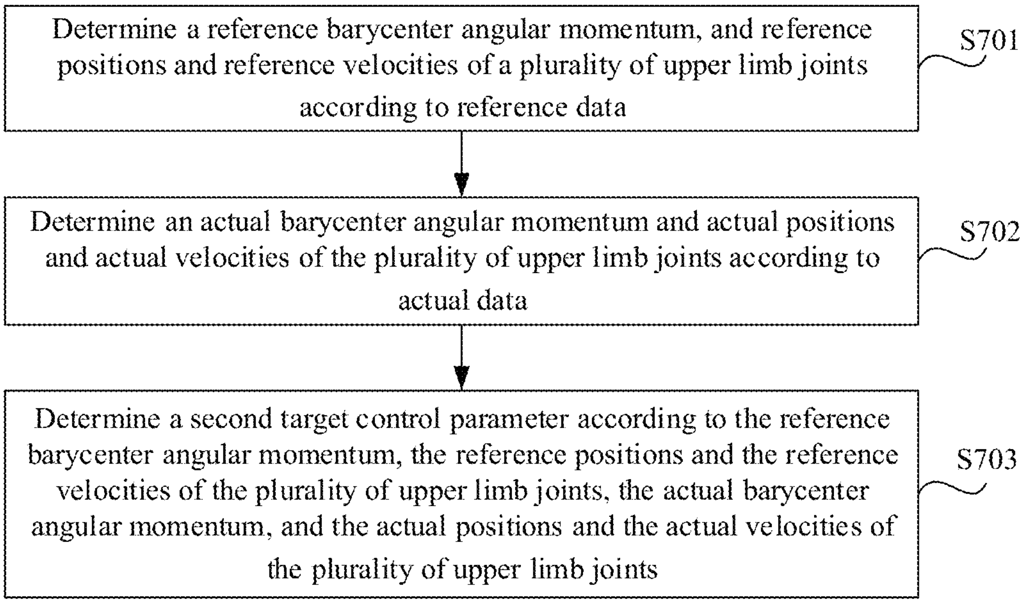
FIG. 7 is a flowchart of a method for determining a second target control parameter of a robot shown according to an example.

FIG. 7 is a flowchart of a method for determining a second target control parameter of a robot shown according to an example. As shown in FIG. 7, in a possible implementation, the determining a second target control parameter of the robot with tracking a barycenter angular momentum and positions and velocities of a plurality of upper limb joints as a target according to the reference data and the actual data may include the following steps.

In step S701, a reference barycenter angular momentum, and reference positions and reference velocities of the plurality of upper limb joints are determined according to the reference data.

In this implementation, a reference barycenter momentum may be obtained with reference to the above determining method of the reference barycenter momentum, that is, the reference barycenter angular momentum may be obtained according to the reference barycenter momentum. The reference positions and the reference velocities of the plurality of upper limb joints are determined according to the reference trajectory.

In step S702, an actual barycenter angular momentum and actual positions and actual velocities of the plurality of upper limb joints are determined according to the actual data.

In this implementation, an actual barycenter momentum may be obtained with reference to the above determining method of the actual barycenter momentum, that is, the actual barycenter angular momentum may be obtained according to the actual barycenter momentum. The actual positions and the actual velocities of the plurality of upper limb joints are determined according to the actual data.

In step S703, the second target control parameter is determined according to the reference barycenter angular momentum, the reference positions and the reference velocities of the plurality of upper limb joints, the actual barycenter angular momentum, and the actual positions and the actual velocities of the plurality of upper limb joints.

In this implementation, whether the robot is in the support phase or the flight phase, control targets of the upper limb joints are to control the barycenter angular momentum of the robot so as to track the reference trajectory. The barycenter momentum of the robot is split into three parts, as shown in the following formula:

$$h = \begin{bmatrix} A_G^{float} & A_G^{leg} & A_G^{arm} \end{bmatrix} \begin{bmatrix} \dot{q}_{float} \\ \dot{q}_{leg} \\ \dot{q}_{arm} \end{bmatrix} \tag{9}$$

Last three rows of h are taken, namely, an angular momentum k part:

$$k = \begin{bmatrix} A_{G,k}^{float} & A_{G,k}^{leg} & A_{G,k}^{arm} \end{bmatrix} \begin{bmatrix} \dot{q}_{float} \\ \dot{q}_{leg} \\ \dot{q}_{arm} \end{bmatrix} \tag{10}$$

A priority-hierarchy momentum control method is introduced here to control motions of the upper limbs.

Firstly, a task of a first priority is to track the reference barycenter angular momentum:

$$k^{des} = k^{ref} + K_7\left(k^{ref} - k\right) \tag{11}$$

where $K_7$ is a gain matrix and an adjustable parameter. (11) is substituted into (10) to be:

$$A_{G,k}^{arm}\dot{q}_{arm}^{des} = k^{des} - A_{G,k}^{float}\dot{q}_{float} - A_{G,K}^{leg}\dot{q}_{leg},$$

where $$\dot{q}_{arm}^{des}$$

is an unknown quantity, and a form of $$A_1\dot{q}_{arm}^{des} = b_1$$

is written to be:

$$\begin{cases} A_1 = A_{G,k}^{arm} \\ b_1 = k^{des} - A_{G,k}^{float}\dot{q}_{float} - A_{G,k}^{leg}\dot{q}_{leg} \end{cases} \tag{12}$$

Secondly, a task of a second priority is to track and refer to the positions and velocities of the upper limb joints:

$$\dot{q}_{arm}^{des} = \dot{q}_{arm}^{ref} + K_8\left(q_{arm}^{ref} - q_{arm}\right) \tag{13}$$

where Kg is a gain matrix and an adjustable parameter. Likewise, a form of $$A_2\dot{q}_{arm}^{des} = b_2$$

is written to be:

$$\begin{cases} A_2 = I \\ b_2 = \dot{q}_{arm}^{ref} + K_8\left(q_{arm}^{ref} - q_{arm}\right) \end{cases} \tag{14}$$

where I is a unit matrix with the same dimension as $q_{arm}$.

A null-space projection technology may be used so that a solution of the second-priority task is within a null space of a solution of the first-priority task, and finally, an expected upper limb joint velocity is:

$$\dot{q}_{arm}^{des} = A_1^{\#} b_1 + \left(A_2\left(I - A_1^{\#} A_1\right)\right)^{\#}\left(b_2 - A_2 A_1^{\#} b_1\right) \quad (15)$$

On the basis of a current joint position $q_{arm}$, an expected joint velocity is subjected to integral to obtain an expected joint position:

$$q_{arm}^{des} = q_{arm} + \dot{q}_{arm}^{des}\Delta t \quad (16)$$

where Δt is a cycle duration of a controller. Finally, an expected joint torque of an upper limb joint space is:

$$\tau_{arm} = K_9\left(q_{arm}^{des} - q_{arm}\right) + K_{10}\left(\dot{q}_{arm}^{des} - \dot{q}_{arm}\right) \quad (17)$$

where $K_9$, $K_{10}$ is a gain coefficient matrix and is usually used as an adjustable parameter.

Through the above method, the second target control parameter $\tau_{arm}$ may be obtained. $\tau_{arm}$ is used as a joint instruction to be sent to upper limb joint ends, and the joints execute the torque instruction so as to complete control over the upper limbs.

A model error usually exists between a model used for obtaining the reference trajectory and a real humanoid robot, the reference trajectory is an open-loop trajectory related to time, and divergence usually occurs if the joints execute the trajectory directly. Thus, in order to make the real humanoid robot achieve continuous jumping, an example of the disclosure provides a real-time closed-loop control method based on barycenter momentum control. The method implements closed-loop tracking of the reference barycenter momentum through hierarchical control over the barycenter line momentum and the angular momentum. The above method for controlling the robot of the disclosure has the following advantages.

The method is a method for controlling a robot based on the barycenter momentum, a coordinative effect of upper and lower limbs is considered, the different actual states are determined according to a state machine, and thus different control targets and implementations are given. The controller of the upper limbs is a hierarchical controller, the first priority is to guarantee stability and tracking of the barycenter angular momentum of the robot, so system robustness is greatly improved in the jumping process, and outside interference and a match error of the model can be resisted.

A key feature—the barycenter momentum in whole body dynamics is extracted, and the control target is to guarantee tracking of the reference barycenter line momentum and the angular momentum instead of tracking the reference trajectory of generalized joints. Thus, the method can be adapted to various humanoid robot structures and driving forms, and dependence on accuracy of model information is greatly reduced.

The state machine based on foot bottom stress can better reflect a key physical nature of continuous jumping.

Figure 8:
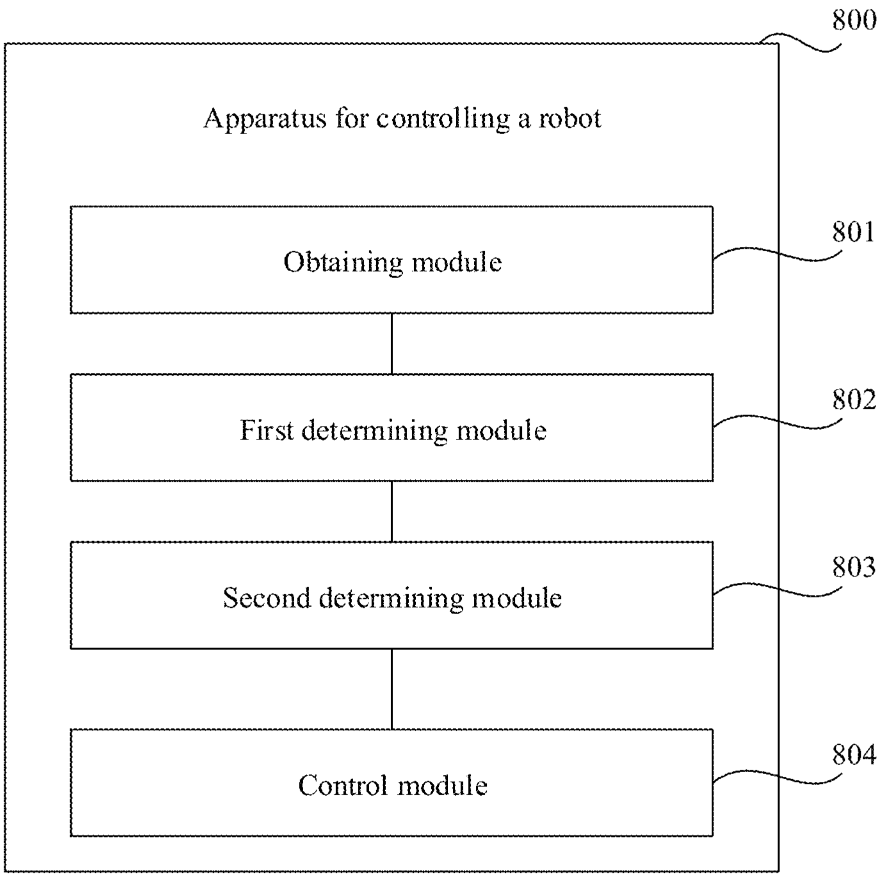
FIG. 8 is a block diagram of an apparatus for controlling a robot shown according to an example.

FIG. 8 is a block diagram of an apparatus for controlling a robot shown according to an example. Referring to FIG. 8, the apparatus includes an obtaining module 801, a first determining module 802, a second determining module 803 and a control module 804.

The obtaining module 801 is configured to obtain reference data and actual data of the robot at a current control moment, the reference data being reference physical values corresponding to a plurality of target parts when the robot performs a target motion, and the actual data being actual physical values corresponding to the plurality of target parts when the robot performs the target motion.

The first determining module 802 is configured to determine an actual attitude of the robot according to the actual data, the actual attitude being one of a support phase or a flight phase.

The second determining module 803 is configured to determine a first target control parameter of the robot based on the reference data and the actual data according to the actual attitude.

The control module 804 is configured to control the robot according to the first target control parameter.

In some examples, the actual data include a first support force of a first foot bottom and a second support force of a second foot bottom.

The first determining module 802 includes:

a first determining sub-module, configured to determine the actual attitude of the robot as the support phase in response to determining that a smaller one of the first support force and the second support force is greater than or equal to a first preset threshold value; and a second determining sub-module, configured to determine the actual attitude of the robot as the flight phase in response to determining that a larger one of the first support force and the second support force is smaller than or equal to a second preset threshold value and a duration that the support phase lasts for is greater than or equal to a preset time threshold value.

In some examples, the first target control parameter includes a first lower limb control parameter.

The second determining module 803 includes:

a third determining sub-module, configured to determine the first lower limb control parameter of the robot according to the reference data and the actual data with tracking a barycenter line momentum and an upper body attitude as a target in a case that the actual attitude is the support phase.

In some examples, the third determining sub-module includes:

a first determining sub-unit, configured to determine a reference barycenter line momentum and a reference barycenter position according to the reference data;

a second determining sub-unit, configured to determine an actual barycenter line momentum and an actual barycenter position according to the actual data;

a third determining sub-unit, configured to determine a first external force of a first foot bottom and a second external force of a second foot bottom of the robot according to a barycenter line momentum tracking control law and a tracking control law of the upper body attitude based on the reference barycenter line momentum, the reference barycenter position, the actual barycenter line momentum and the actual barycenter position; and a fourth determining sub-unit, configured to determine the first lower limb control parameter according to the first external force and the second external force, the first lower limb control parameter being control parameters corresponding to a plurality of lower limb joints.

In some examples, the first target control parameter includes a second lower limb control parameter.

The second determining module 803 includes:

a fourth determining sub-module, configured to determine the second lower limb control parameter of the robot according to the reference data and the actual data with tracking foot-down points of feet ends as a target in a case that the actual attitude is the flight phase.

In some examples, the fourth determining sub-module includes:

a fifth determining sub-unit, configured to determine a barycenter velocity error of the robot in a target direction according to the reference data and the actual data, the barycenter velocity error being used for adjusting positions of the foot-down points relative to a barycenter; and a sixth determining sub-unit, configured to determine the second lower limb control parameter according to reference positions and reference velocities of a plurality of lower limb joints in the reference data and the barycenter velocity error, the second lower limb control parameter being control parameters corresponding to the plurality of lower limb joints.

In some examples, the apparatus 800 further includes:

a third determining module, configured to determine a second target control parameter of the robot with tracking a barycenter angular momentum and positions and velocities of a plurality of upper limb joints as a target according to the reference data and the actual data.

The control module 804 includes:

a control sub-module, configured to control the robot according to the first target control parameter and the second target control parameter, the first target control parameter being control parameters corresponding to a plurality of lower limb joints, and the second target control parameter being control parameters corresponding to the plurality of upper limb joints.

In some examples, the third determining module includes:

a fifth determining sub-module, configured to determine a reference barycenter angular momentum, and reference positions and reference velocities of the plurality of upper limb joints according to the reference data;

a sixth determining sub-module, configured to determine an actual barycenter angular momentum and actual positions and actual velocities of the plurality of upper limb joints according to the actual data; and a seventh determining sub-module, configured to determine the second target control parameter according to the reference barycenter angular momentum, the reference positions and the reference velocities of the plurality of upper limb joints, the actual barycenter angular momentum, and the actual positions and the actual velocities of the plurality of upper limb joints.

As for the apparatus in the above example, specific modes of executing operations by all the modules are already described in detail in the example related to the method and will not be described in detail here.

The disclosure further provides a computer-readable storage medium, storing a computer program instruction, the program instruction implementing, when executed by a processor, steps of the method for controlling the robot provided by the disclosure.

Figure 9:
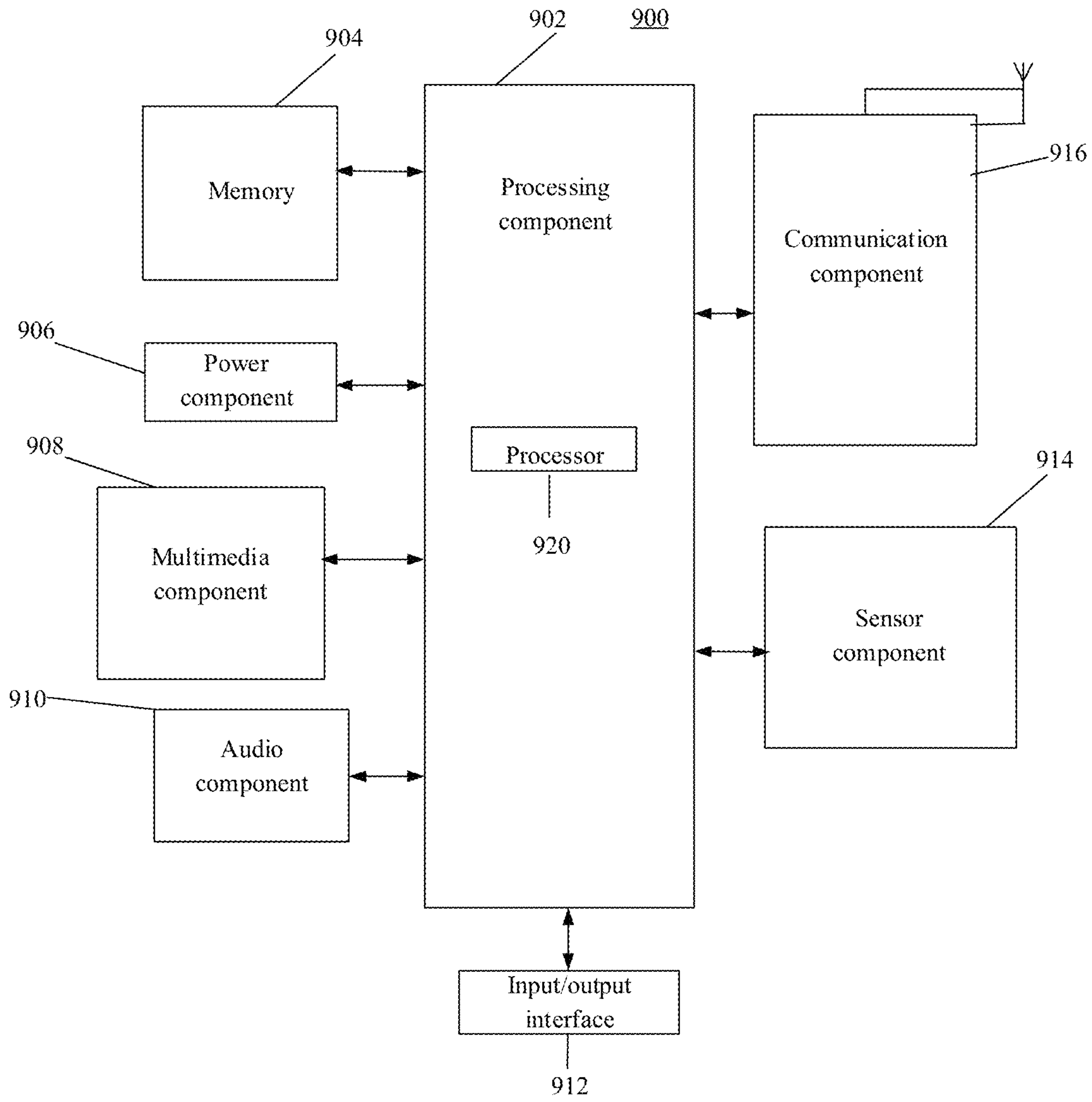
FIG. 9 is a block diagram of an apparatus for robot control shown according to an example.

FIG. 9 is a block diagram of an electronic apparatus shown according to an example. For example, the apparatus 900 may be a mobile phone, a computer, a messaging device, a console, a tablet device and the like.

Referring to FIG. 9, the apparatus 900 may include one or more components as follows: a processing component 902, a memory 904, a power component 906, a multimedia component 908, an audio component 910, an input/output interface 912, a sensor component 914 and a communication component 916.

The processing component 902 generally controls a whole operation of the apparatus 900, such as operations related to display, a phone call, data communication, a camera operation and a recording operation. The processing component 902 may include one or more processors 920 for executing instructions so as to complete all or part of steps of the above method for controlling the robot. Besides, the processing component 902 may include one or more modules to facilitate interaction between the processing component 902 and the other components. For example, the processing component 902 may include a multimedia module so as to facilitate interaction between the multimedia component 908 and the processing component 902.

The memory 904 is configured to store various types of data so as to support operations on the apparatus 900. Instances of these data include instructions of any application program or method for operations on the apparatus 900, contact person data, telephone directory data, messages, pictures, videos and the like. The memory 904 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 906 provides power for various components of the apparatus 900. The power component 906 may include a power management system, one or more power sources, and other components related to power generation, management and distribution for the apparatus 900.

The multimedia component 908 includes a screen which provides an output interface between the apparatus 900 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors so as to sense touching, swiping and gestures on the touch panel. The touch sensor can not only sense a boundary of a touching or swiping action, but also detect duration and pressure related to a touching or swiping operation. In some examples, the multimedia component 908 includes a front camera and/or a back camera. When the apparatus 900 is in an operation mode, such as a photographing mode or a video mode, the front camera and/or the back camera can receive external multimedia data. Each front camera and each back camera may be a fixed optical lens system or have a focal length and an optical zoom capability.

The audio component 910 is configured to output and/or input an audio signal. For example, the audio component 910 includes a microphone (MIC). When the apparatus 900 is in the operation mode, such as a call mode, a recording mode and a voice recognition mode, the microphone is configured to receive an external audio signal. The received audio signal may be further stored in the memory 904 or sent via the communication component 916. In some examples, the audio component 910 further includes a speaker for outputting the audio signal.

The input/output interface 912 provides an interface between the processing component 902 and a peripheral interface module, and the above peripheral interface module may be a keyboard, a click wheel, buttons and the like. These buttons may include but are not limited to: a home button, a volume button, a start button and a lock button.

The sensor component 914 includes one or more sensors, configured to provide state evaluation of various aspects for the apparatus 900. For example, the sensor component 914 may detect a start/shut-down state of the apparatus 900 and relative positioning of the components, for example, the components are a display and a keypad of the apparatus 900. The sensor component 914 may further detect location change of the apparatus 900 or one component of the apparatus 900, whether there is contact between the user and the apparatus 900, azimuth or acceleration/deceleration of the apparatus 900 and temperature change of the apparatus 900. The sensor component 914 may include a proximity sensor, configured to detect existence of a nearby object without any physical contact. The sensor component 914 may further include an optical sensor, such as a CMOS or a CCD image sensor, for use in imaging application. In some examples, the sensor component 914 may further include an acceleration sensor, a gyroscope sensor, a magnetic sensor, a pressure sensor or a temperature sensor.

The communication component 916 is configured to facilitate wired or wireless communication between the apparatus 900 and other devices. The apparatus 900 may access a wireless network based on a communication standard, such as WiFi, 2G or 3G, or their combination. In an example, the communication component 916 receives a broadcast signal or related broadcast information from an external broadcast management system via a broadcast channel. In an example, the communication component 916 further includes a near-field communication (NFC) module so as to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In an example, the apparatus 900 may be implemented by one or more than one application specific integrated circuit (ASIC), digital signal processor (DSP), digital signal processing device (DSPD), programmable logic device (PLD), field-programmable gate array (FPGA), controller, micro control unit, microprocessor or other electronic elements for executing the above method for controlling the robot.

In an example, a non-transitory computer-readable storage medium including instructions is further provided, such as a memory 904 including the instructions. The above instructions may be executed by a processor 920 of an apparatus 900 so as to complete the above method for controlling the robot. For example, the non-transitory computer-readable storage medium may be an ROM, a random access memory (RAM), a CD-ROM, a magnetic tape, a floppy disk, an optical data storage device and the like.

In another example, a computer program product is further provided, the computer program product containing a computer program executable by a programmable apparatus, and the computer program having a code part which is used for executing, when executed by the programmable apparatus, the above method for controlling the robot.

Those skilled in the art will easily figure out other implementation solutions of the disclosure after considering the specification and practicing the disclosure. The present application intends to cover any transformations, purposes or adaptive changes of the disclosure, and these transformations, purposes or adaptive changes conform to a general principle of the disclosure and include common general knowledge or conventional technical means which are not disclosed by the disclosure in the technical field. The specification and the examples are merely regarded as examples, and the true scope and spirit of the disclosure are indicated by the following claims.

It is to be understood that the disclosure is not limited to an accurate structure described above and shown in the accompanying drawings, and various modifications and changes can be made without departing from its scope. The scope of the disclosure is limited merely by the appended claims.

According to a first aspect of an example of the disclosure, a method for controlling a robot is provided and includes:

obtaining reference data and actual data of the robot at a current control moment, the reference data being reference physical values corresponding to a plurality of target parts when the robot performs a target motion, and the actual data being actual physical values corresponding to the plurality of target parts when the robot performs the target motion;

determining an actual attitude of the robot according to the actual data, the actual attitude being one of a support phase or a flight phase;

determining a first target control parameter of the robot based on the reference data and the actual data according to the actual attitude; and controlling the robot according to the first target control parameter.

In some examples, the actual data include a first support force of a first foot bottom and a second support force of a second foot bottom; and determining the actual attitude of the robot according to the actual data includes:

determining the actual attitude of the robot as the support phase in response to determining that a smaller one of the first support force and the second support force is greater than or equal to a first preset threshold value; and determining the actual attitude of the robot as the flight phase in response to determining that a larger one of the first support force and the second support force is smaller than or equal to a second preset threshold value and a duration that the support phase lasts for is greater than or equal to a preset time threshold value.

In some examples, the first target control parameter includes a first lower limb control parameter; and determining the first target control parameter of the robot based on the reference data and the actual data according to the actual attitude includes:

determining the first lower limb control parameter of the robot according to the reference data and the actual data with tracking a barycenter line momentum and an upper body attitude as a target in a case that the actual attitude is the support phase.

In some examples, the determining the first lower limb control parameter of the robot according to the reference data and the actual data with tracking a barycenter line momentum and an upper body attitude as a target includes:

determining a reference barycenter line momentum and a reference barycenter position according to the reference data;

determining an actual barycenter line momentum and an actual barycenter position according to the actual data;

determining a first external force of a first foot bottom and a second external force of a second foot bottom of the robot according to a barycenter line momentum tracking control law and a tracking control law of the upper body attitude based on the reference barycenter line momentum, the reference barycenter position, the actual barycenter line momentum and the actual barycenter position; and determining the first lower limb control parameter according to the first external force and the second external force, the first lower limb control parameter being control parameters corresponding to a plurality of lower limb joints.

In some examples, the first target control parameter includes a second lower limb control parameter; and determining the first target control parameter of the robot based on the reference data and the actual data according to the actual attitude includes:

determining the second lower limb control parameter of the robot according to the reference data and the actual data with tracking foot-down points of feet ends as a target in a case that the actual attitude is the flight phase.

In some examples, the determining the second lower limb control parameter of the robot according to the reference data and the actual data with tracking foot-down points of feet ends as a target includes:

determining a barycenter velocity error of the robot in a target direction according to the reference data and the actual data, the barycenter velocity error being used for adjusting positions of the foot-down points relative to a barycenter; and determining the second lower limb control parameter according to reference positions and reference velocities of a plurality of lower limb joints in the reference data and the barycenter velocity error, the second lower limb control parameter being control parameters corresponding to the plurality of lower limb joints.

In some examples, the method further includes:

determining a second target control parameter of the robot with tracking a barycenter angular momentum and positions and velocities of a plurality of upper limb joints as a target according to the reference data and the actual data; and controlling the robot according to the first target control parameter includes:

controlling the robot according to the first target control parameter and the second target control parameter, the first target control parameter being control parameters corresponding to a plurality of lower limb joints of the robot, and the second target control parameter being control parameters corresponding to the plurality of upper limb joints of the robot.

In some examples, the determining a second target control parameter of the robot with tracking a barycenter angular momentum and positions and velocities of a plurality of upper limb joints as a target according to the reference data and the actual data includes:

determining a reference barycenter angular momentum, and reference positions and reference velocities of the plurality of upper limb joints according to the reference data;

determining an actual barycenter angular momentum and actual positions and actual velocities of the plurality of upper limb joints according to the actual data; and determining the second target control parameter according to the reference barycenter angular momentum, the reference positions and the reference velocities of the plurality of upper limb joints, the actual barycenter angular momentum, and the actual positions and the actual velocities of the plurality of upper limb joints.

According to a second aspect of an example of the disclosure, an apparatus for controlling a robot is provided and includes:

an obtaining module, configured to obtain reference data and actual data of the robot at a current control moment, the reference data being reference physical values corresponding to a plurality of target parts when the robot performs a target motion, and the actual data being actual physical values corresponding to the plurality of target parts when the robot performs the target motion;

a first determining module, configured to determine an actual attitude of the robot according to the actual data, the actual attitude being one of a support phase or a flight phase;

a second determining module, configured to determine a first target control parameter of the robot based on the reference data and the actual data according to the actual attitude; and a control module, configured to control the robot according to the first target control parameter.

According to a third aspect of an example of the disclosure, an electronic device is provided and includes:

a processor; and a memory, configured to store an instruction executable by the processor; where the processor is configured to execute steps of the method for controlling the robot provided by the first aspect of the disclosure.

According to a fourth aspect of an example of the disclosure, a computer-readable storage medium is provided, storing a computer program instruction, the program instruction implementing, when executed by a processor, steps of the method for controlling the robot provided by the first aspect of the disclosure.

What is claimed is:

1. A method for controlling a robot, performed by an electronic device, the method comprising:

obtaining reference data and actual data of the robot at a current control moment, wherein the reference data comprises reference physical values corresponding to a plurality of target parts when the robot performs a target motion, and the actual data comprises actual physical values corresponding to the plurality of target parts when the robot performs the target motion;

determining an actual attitude of the robot according to the actual data, wherein the actual attitude comprises one of a support phase or a flight phase;

determining a first target control parameter of the robot based on the reference data and the actual data according to the actual attitude, wherein the first target control parameter comprises a first lower limb control parameter and a second lower limb control parameter; and controlling the robot according to the first target control parameter, wherein determining the first target control parameter of the robot based on the reference data and the actual data according to the actual attitude comprises:

determining the second lower limb control parameter of the robot according to the reference data and the actual data with tracking foot-down points of feet ends as a target in a case that the actual attitude is the flight phase; and determining the first lower limb control parameter of the robot according to the reference data and the actual data with tracking a barycenter line momentum and an upper body attitude as the target in a case that the actual attitude is the support phase, wherein determining the second lower limb control parameter of the robot according to the reference data and the actual data with tracking the foot-down points of the feet ends as the target comprises:

determining a barycenter velocity error of the robot in a target direction according to the reference data and the actual data, wherein the barycenter velocity error is used for adjusting positions of the foot-down points relative to a barycenter; and determining the second lower limb control parameter according to reference positions and reference velocities of a plurality of lower limb joints in the reference data and the barycenter velocity error, wherein the second lower limb control parameter comprises control parameters corresponding to the plurality of lower limb joints, wherein determining the first lower limb control parameter of the robot according to the reference data and the actual data with tracking the barycenter line momentum and the upper body attitude as the target comprises:

determining a reference barycenter line momentum and a reference barycenter position according to the reference data;

determining an actual barycenter line momentum and an actual barycenter position according to the actual data;

determining a first external force of a first foot bottom and a second external force of a second foot bottom of the robot according to a barycenter line momentum tracking control law and a tracking control law of the upper body attitude based on the reference barycenter line momentum, the reference barycenter position, the actual barycenter line momentum, and the actual barycenter position; and determining the first lower limb control parameter according to the first external force and the second external force, wherein the first lower limb control parameter comprises the control parameters corresponding to the plurality of lower limb joints, and wherein controlling the robot according to the first target control parameter comprises:

controlling the plurality of lower limb joints of the robot according to the first lower limb control parameter or the second lower limb control parameter, and determining the second lower limb control parameter according to reference positions and reference velocities of the plurality of lower limb joints in the reference data and the barycenter velocity error comprises:

determining a first difference between desired positions of the plurality of lower limb joints and generalized positions of the plurality of lower limb joints, determining a second difference between desired velocities of the plurality of lower limb joints and generalized velocities of the plurality of lower limb joints, and obtaining a first gain coefficient matrix corresponding to the first difference and a second gain coefficient matrix corresponding to the second difference; and determining the second lower limb control parameter according to the first difference, the second difference, the first gain coefficient matrix, and the second gain coefficient matrix, and wherein the desired position of a hip-pitch joint among the plurality of lower limb joints is determined based on the reference position of the hip-pitch joint and the barycenter velocity error;

the desired positions of other lower limb joints among the plurality of lower limb joints except the hip-pitch joint are the reference positions of the other lower limb joints; and the desired velocities of the plurality of lower limb joints are the reference velocities of the plurality of lower limb joints.

2. The method for controlling the robot according to claim 1, wherein the actual data comprises a first support force of a first foot bottom and a second support force of a second foot bottom; and determining the actual attitude of the robot according to the actual data comprises:

determining the actual attitude of the robot as the support phase in response to determining that a smaller one of the first support force and the second support force is greater than or equal to a first preset threshold value; and determining the actual attitude of the robot as the flight phase in response to determining that a larger one of the first support force and the second support force is smaller than or equal to a second preset threshold value, and a duration that the support phase lasts for is greater than or equal to a preset time threshold value.

3. The method for controlling the robot according to claim 1, further comprising:

determining a second target control parameter of the robot with tracking a barycenter angular momentum and positions and velocities of a plurality of upper limb joints as the target according to the reference data and the actual data; and controlling the robot according to the first target control parameter comprises:

controlling the robot according to the first target control parameter and the second target control parameter, wherein the first target control parameter comprises control parameters corresponding to the plurality of lower limb joints of the robot, and the second target control parameter comprises control parameters corresponding to the plurality of upper limb joints of the robot.

4. The method for controlling the robot according to claim 3, wherein determining the second target control parameter of the robot with tracking the barycenter angular momentum and the positions and the velocities of the plurality of upper limb joints as the target according to the reference data and the actual data comprises:

determining a reference barycenter angular momentum, and reference positions and reference velocities of the plurality of upper limb joints according to the reference data;

determining an actual barycenter angular momentum and actual positions and actual velocities of the plurality of upper limb joints according to the actual data; and determining the second target control parameter according to the reference barycenter angular momentum, the reference positions and the reference velocities of the plurality of upper limb joints, the actual barycenter angular momentum, and the actual positions and the actual velocities of the plurality of upper limb joints.

5. The method for controlling the robot according to claim 1, wherein determining the second lower limb control parameter according to the first difference, the second difference, the first gain coefficient matrix, and the second gain coefficient matrix by using the following formulas:

$$\tau_{leg}^{flight} = K_5\left(q_{leg}^{des} - q_{leg}\right) + K_6\left(\dot{q}_{leg}^{des} - \dot{q}_{leg}\right); \text{ and } \begin{cases} q_{leg}^{des} = \begin{cases} q_{i1}^{ref} = \Delta q_{hip,pitch} \\ q_{i2}^{des} \end{cases}; \\ \dot{q}_{leg}^{des} = \dot{q}_{leg}^{ref} \end{cases}$$

wherein $$\tau_{leg}^{flight}$$

represents the second lower limb control parameter, $K_5$ represents the first gain coefficient matrix, $K_6$ represents the second gain coefficient matrix, $$q_{leg}^{des}$$

represents the desired positions of the plurality of lower limb joints, $q_{leg}$ represents the generalized positions of the plurality of lower limb joints, $$\dot{q}_{leg}^{des}$$

represents the desired velocities of the plurality of lower limb joints, $q_{leg}$ represents generalized velocities of the plurality of lower limb joints, $$q_{i1}^{ref}$$

represents the reference position of the hip-pitch joint, $\Delta q_{hip,pitch}$ represents the barycenter velocity error, $$q_{i2}^{des}$$

represents the desired positions of other lower limb joints among the plurality of lower limb joints except the hip-pitch joint, $$\dot{q}_{leg}^{des}$$

represents the desired velocities of the plurality of lower limb joints, and $$\dot{q}_{leg}^{ref}$$

represents the reference velocities of the plurality of lower limb joints.

6. The method for controlling the robot according to claim 1, further comprising:

smoothly reducing parameter magnitudes of the first gain coefficient matrix and the second gain coefficient matrix in a falling process, after the robot reaches a highest point in air; and reducing the parameter magnitudes of the first gain coefficient matrix and the second gain coefficient matrix to γ times original parameter magnitudes at a desired falling-to-ground moment, wherein $0<y<1$.

7. An electronic device, comprising:

a processor; and a memory configured to store an instruction executable by the processor; wherein the processor is configured to:

obtain reference data and actual data of a robot at a current control moment, wherein the reference data comprises reference physical values corresponding to a plurality of target parts when the robot performs a target motion, and the actual data comprises actual physical values corresponding to the plurality of target parts when the robot performs the target motion;

determine an actual attitude of the robot according to the actual data, wherein the actual attitude comprises one of a support phase or a flight phase;

determine a first target control parameter of the robot based on the reference data and the actual data according to the actual attitude, wherein the first target control parameter comprises a first lower limb control parameter and a second lower limb control parameter; and control the robot according to the first target control parameter, wherein the processor is further configured to:

determine the second lower limb control parameter of the robot according to the reference data and the actual data with tracking foot-down points of feet ends as a target in a case that the actual attitude is the flight phase; and determine the first lower limb control parameter of the robot according to the reference data and the actual data with tracking a barycenter line momentum and an upper body attitude as the target in a case that the actual attitude is the support phase, wherein the processor is further configured to:

determine a barycenter velocity error of the robot in a target direction according to the reference data and the actual data, wherein the barycenter velocity error is used for adjusting positions of the foot-down points relative to a barycenter; and determine the second lower limb control parameter according to reference positions and reference velocities of a plurality of lower limb joints in the reference data and the barycenter velocity error, wherein the second lower limb control parameter comprises control parameters corresponding to the plurality of lower limb joints, wherein the processor is further configured to:

determine a reference barycenter line momentum and a reference barycenter position according to the reference data;

determine an actual barycenter line momentum and an actual barycenter position according to the actual data;

determine a first external force of a first foot bottom and a second external force of a second foot bottom of the robot according to a barycenter line momentum tracking control law and a tracking control law of the upper body attitude based on the reference barycenter line momentum, the reference barycenter position, the actual barycenter line momentum, and the actual barycenter position; and determine the first lower limb control parameter according to the first external force and the second external force, wherein the first lower limb control parameter comprises the control parameters corresponding to the plurality of lower limb joints, and wherein the processor is further configured to:

control the plurality of lower limb joints of the robot according to the first lower limb control parameter or the second lower limb control parameter, and the processor is further configured to:

determine a first difference between desired positions of the plurality of lower limb joints and generalized positions of the plurality of lower limb joints, determine a second difference between desired velocities of the plurality of lower limb joints and generalized velocities of the plurality of lower limb joints, and obtain a first gain coefficient matrix corresponding to the first difference and a second gain coefficient matrix corresponding to the second difference; and determine the second lower limb control parameter according to the first difference, the second difference, the first gain coefficient matrix, and the second gain coefficient matrix, and wherein the desired position of a hip-pitch joint among the plurality of lower limb joints is determined based on the reference position of the hip-pitch joint and the barycenter velocity error;

the desired positions of other lower limb joints among the plurality of lower limb joints except the hip-pitch joint are the reference positions of the other lower limb joints; and the desired velocities of the plurality of lower limb joints are the reference velocities of the plurality of lower limb joints.

8. The electronic device according to claim 7, wherein the actual data comprises a first support force of a first foot bottom and a second support force of a second foot bottom; and the processor is further configured to:

determine the actual attitude of the robot as the support phase in response to determining that a smaller one of the first support force and the second support force is greater than or equal to a first preset threshold value; and determine the actual attitude of the robot as the flight phase in response to determining that a larger one of the first support force and the second support force is smaller than or equal to a second preset threshold value, and a duration that the support phase lasts for is greater than or equal to a preset time threshold value.

9. The electronic device according to claim 7, wherein the processor is further configured to:

determine a second target control parameter of the robot with tracking a barycenter angular momentum and positions and velocities of a plurality of upper limb joints as the target according to the reference data and the actual data; and control the robot according to the first target control parameter and the second target control parameter, wherein the first target control parameter comprises control parameters corresponding to the plurality of lower limb joints of the robot, and the second target control parameter comprises control parameters corresponding to the plurality of upper limb joints of the robot.

10. The electronic device according to claim 9, wherein the processor is further configured to:

determine a reference barycenter angular momentum, and reference positions and reference velocities of the plurality of upper limb joints according to the reference data;

determine an actual barycenter angular momentum and actual positions and actual velocities of the plurality of upper limb joints according to the actual data; and determine the second target control parameter according to the reference barycenter angular momentum, the reference positions and the reference velocities of the plurality of upper limb joints, the actual barycenter angular momentum, and the actual positions and the actual velocities of the plurality of upper limb joints.

11. A non-transitory computer-readable storage medium storing a computer program instruction, wherein the computer program instruction is configured to, when executed by a processor:

obtain reference data and actual data of a robot at a current control moment, wherein the reference data comprises reference physical values corresponding to a plurality of target parts when the robot performs a target motion, and the actual data comprises actual physical values corresponding to the plurality of target parts when the robot performs the target motion;

determine an actual attitude of the robot according to the actual data, wherein the actual attitude comprises one of a support phase or a flight phase;

determine a first target control parameter of the robot based on the reference data and the actual data according to the actual attitude, wherein the first target control parameter comprises a first lower limb control parameter and a second lower limb control parameter; and control the robot according to the first target control parameter, wherein the computer program instruction is further configured to, when executed by the processor:

determine the second lower limb control parameter of the robot according to the reference data and the actual data with tracking foot-down points of feet ends as a target in a case that the actual attitude is the flight phase; and determine the first lower limb control parameter of the robot according to the reference data and the actual data with tracking a barycenter line momentum and an upper body attitude as the target in a case that the actual attitude is the support phase, wherein the computer program instruction is further configured to, when executed by the processor:

determine a barycenter velocity error of the robot in a target direction according to the reference data and the actual data, wherein the barycenter velocity error is used for adjusting positions of the foot-down points relative to a barycenter; and determine the second lower limb control parameter according to reference positions and reference velocities of a plurality of lower limb joints in the reference data and the barycenter velocity error, wherein the second lower limb control parameter comprises control parameters corresponding to the plurality of lower limb joints, wherein the computer program instruction is further configured to, when executed by the processor:

determine a reference barycenter line momentum and a reference barycenter position according to the reference data;

determine an actual barycenter line momentum and an actual barycenter position according to the actual data;

determine a first external force of a first foot bottom and a second external force of a second foot bottom of the robot according to a barycenter line momentum tracking control law and a tracking control law of the upper body attitude based on the reference barycenter line momentum, the reference barycenter position, the actual barycenter line momentum, and the actual barycenter position; and determine the first lower limb control parameter according to the first external force and the second external force, wherein the first lower limb control parameter comprises the control parameters corresponding to the plurality of lower limb joints, and wherein the computer program instruction is further configured to, when executed by the processor:

control the plurality of lower limb joints of the robot according to the first lower limb control parameter or the second lower limb control parameter, and the computer program instruction is further configured to, when executed by the processor:

determine a first difference between desired positions of the plurality of lower limb joints and generalized positions of the plurality of lower limb joints, determine a second difference between desired velocities of the plurality of lower limb joints and generalized velocities of the plurality of lower limb joints, and obtain a first gain coefficient matrix corresponding to the first difference and a second gain coefficient matrix corresponding to the second difference; and determine the second lower limb control parameter according to the first difference, the second difference, the first gain coefficient matrix, and the second gain coefficient matrix, and wherein the desired position of a hip-pitch joint among the plurality of lower limb joints is determined based on the reference position of the hip-pitch joint and the barycenter velocity error;

the desired positions of other lower limb joints among the plurality of lower limb joints except the hip-pitch joint are the reference positions of the other lower limb joints; and the desired velocities of the plurality of lower limb joints are the reference velocities of the plurality of lower limb joints.

12. The non-transitory computer-readable storage medium according to claim 11, wherein the actual data comprises a first support force of a first foot bottom and a second support force of a second foot bottom; and the computer program instruction is further configured to, when executed by the processor:

determine the actual attitude of the robot as the support phase in response to determining that a smaller one of the first support force and the second support force is greater than or equal to a first preset threshold value; and determine the actual attitude of the robot as the flight phase in response to determining that a larger one of the first support force and the second support force is smaller than or equal to a second preset threshold value and a duration that the support phase lasts for is greater than or equal to a preset time threshold value.

* * * * *